March 17, 1964 W. ENGELS 3,125,126
HARNESS PULLEYS FOR LOOMS
Filed March 22, 1963
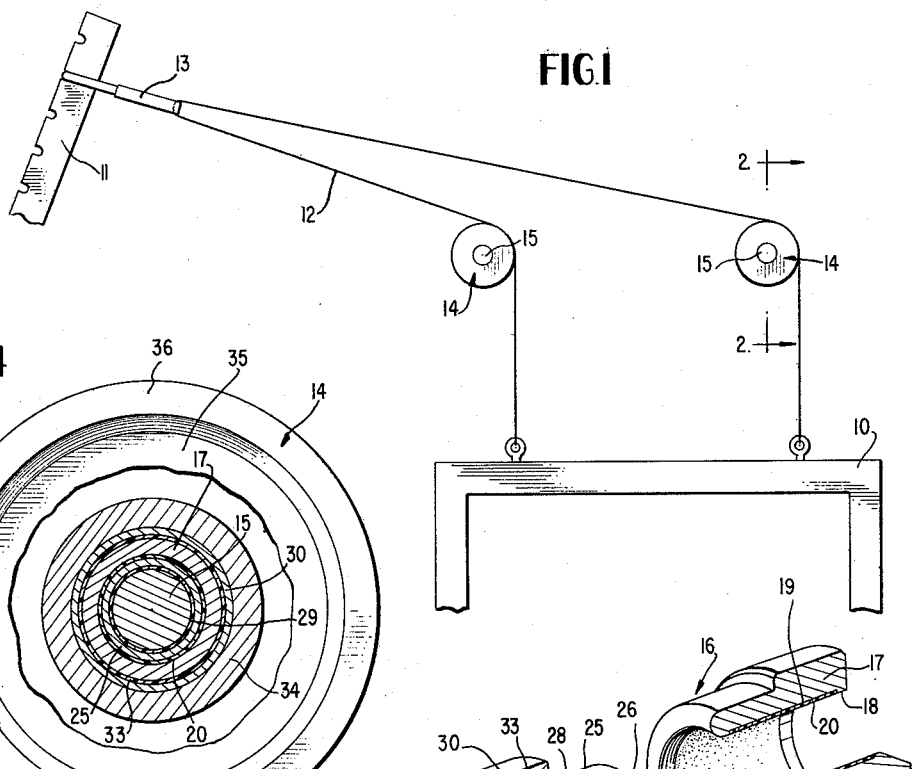
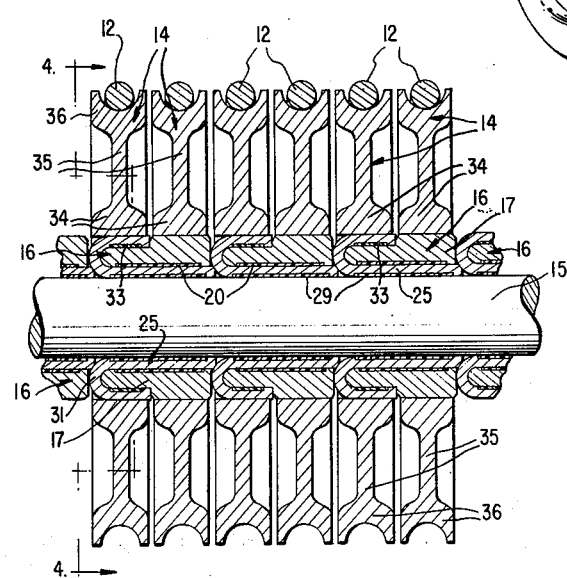
INVENTOR.
WALTER ENGELS
BY
*ATTORNEY*

United States Patent Office 3,125,126
Patented Mar. 17, 1964

3,125,126
HARNESS PULLEYS FOR LOOMS
Walter Engels, Tryon, N.C., assignor to Southern Machinery Company, Greer, S.C., a corporation of South Carolina
Filed Mar. 22, 1963, Ser. No. 267,303
6 Claims. (Cl. 139—84)

This invention relates broadly to looms and more particularly to improvements in harness pulleys for looms.

An object of the invention is to provide a free running durable and economical harness pulley which is self-lubricating and requires no greasing or oiling and which will not bind during operation.

Another object is to provide a harness pulley structure having an adequate shaft bearing area even when the body portion of the pulley is quite narrow and the pulleys are stacked in close relation axially.

Another object is to provide a dual harness pulley having two sections which are independently rotatable on a common interfitting bearing assembly affording a broad and stable bearing with the shaft carrying the pulleys.

Another object is to provide a pulley assembly which is easy to assemble and disassemble and which facilitates the stacking of a multiplicity of pulleys in uniformly spaced relation upon a common carrying shaft.

Other objects and advantages of the invention will be apparent during the course of the following description.

In the accompanying drawings forming a part of this application and in which like numerals are employed to designate like parts throughout the same, FIGURE 1 is a partly diagrammatic view of a loom showing the pulleys of the present invention and a loom harness frame, dobby jack and associated elements, FIGURE 2 is an enlarged central vertical section through a plurality of pulleys mounted upon a shaft according to the invention, FIGURE 3 is an exploded perspective view, partly in cross section, of a pulley bearing assembly, and FIGURE 4 is an end elevational view, partly in section, taken on line 4—4 of FIGURE 2.

In the drawings, wherein for the purpose of illustration is shown a preferred embodiment of the invention, the numeral 10 designates one of a multiplicity of closely spaced parallel loom harness frames adapted to move vertically independently in response to movements of the well-known dobby jacks 11 corresponding in number to the harness frames 10. Each harness frame is attached to a flexible element or wire 12, connected by a suitable dobby loop 13 to the adjacent jack 11 in a well known manner. Each flexible element 12 is trained over a pair of aligned sheaves or pulley sections 14 constructed in accordance with the invention and closely stacked upon common shafts 15 mounted upon the loom frame, not shown.

The pulley or sheave structure proper forming the subject matter of the invention is detailed in FIGURES 2–4 and each pulley comprises a pair of the pulley sections 14 mounted upon a common bearing assembly 16 shown particularly in FIGURES 2 and 3. The pulley sections 14 are independently rotatable with parts of the bearing assembly 16 and the pulley structure requires no lubrication.

The bearing assembly 16 comprises a first rigid sleeve or section 17 having a through bore 18 provided with an undercut cylindrical recess 19 extending for the major portion of its length and receiving therein an insert or liner 20 formed of Teflon, nylon or like synthetic material which is tough and which possesses excellent bearing and self-lubricating properties. The inside diameter of the liner 20 may be slightly smaller than the through bore 18 and the liner is rigid with the sleeve 17 and does not turn relative thereto. The sleeve 17 has a first peripheral portion 21 of a fixed diameter and an extension peripheral portion 22 of reduced diameter and an annular radial shoulder 23 is formed on the sleeve 11 between the two peripheral portions 21 and 22, as shown. The peripheral portion 22 is slightly shorter axially than the portion 21 and its end is rounded at 24.

The bearing assembly 16 further comprises a second sleeve 25 adapted to fit telescopically and rotatably within the bore of sleeve 17 and liner 20. The sleeve 25 is slightly longer than the sleeve 17 so that in assembly, FIGURE 2, its end 26 will project slightly beyond the adjacent end of sleeve 18. The sleeve 25 has a through bore 27, provided with an undercut cylindrical recess 28 similar to the recess 19 and extending for the major portion of the axial length of sleeve 25. Recess 28 receives a thin-walled liner 29 formed of Teflon, nylon or the like and which liner has a bore which may be slightly smaller than the bore 27 for rotatably receiving the shaft 15. Both of the liners 20 and 29 are thin-walled and of substantially equal thickness, as shown.

Sleeve 25 carries an outer reversely directed annular extension 30 integral therewith and spaced radially therefrom and overlying about one-half of the length of sleeve 25 and connected therewith by an annular rounded bight portion 31 which is curved to interfit slidably in assembly with the rounded annular end 24 and to lightly engage the end 26 and the adjacent end of sleeve 17, FIGURE 2, of the next adjacent dual pulley assembly. The interior of extension 30 has an annular recess 32 formed therein receiving a thin-walled liner 33 formed of Teflon, nylon or the like. The internal diameter of this liner 33 may be slightly smaller than the internal diameter of extension 30 but slightly larger than the external diameter of peripheral portion 22 so that the two sleeves 17 and 25 may have free relative rotation in assembly. In assembly, FIGURE 2, the radial shoulder 23 may abut the free end of annular extension 30 slidably. The sleeves 17 and 25 interfit telescopically in the manner clearly shown in FIGURE 2 and the sleeve 25 provides an axially long and stable bearing surface with the shaft 15. Likewise, the sleeve 17 provides an almost equally long rotatable bearing support for one of the pulley sections 14 with the interior sleeve 25 of the bearing assembly and the fact that both of the pulley sections 14 are quite narrow does not therefore limit or restrict the length of the bearing area as is evident from an inspection of FIGURE 2. Stated differently, each relatively narrow pulley section 14 has the benefit of a bearing surface axially which is approximately twice as long as the hub portion 34 of each pulley section.

The hub portions 34 have a light pressed fit upon sleeev portion 21 and extensions 30 respectively, and the pulley sections have narrow disc portions 35 and grooved rims 36 to receive the flexible elements 12 or wires. The pulley sections 14 rotate with the sleeves 17 and 25 independently responsive to the movements of the dobby jacks 11 and relative to the shafts 15.

The arrangement allows a multiplicity of the pulley sections 14 to be closely and equidistantly stacked upon the shafts 15 in alignment with the stack harness frames 10 and dobby jacks 11. The bearing assemblies 16 are likewise stacked in lightly engaging, sliding or slightly spaced relation, and adjustable collars on the shafts 15, not shown, may regulate the spacing or stacking of the dual pulley assemblies and the bearing assemblies 16 upon the shafts, as should be obvious. The pulley structure is ideally suited to the loom harness mechanism application and no lubrication is required and there is minimum wear and the structure is rugged and durable and the pulleys are free running with minimum wobbling. Alignment problems are completely solved and disassembly or replacement is rendered very simple. Other advantages of the construction will be readily apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. In a loom harness pulley assembly, an inner relatively long bearing sleeve having an undercut bore engageable over a carrying shaft, a liner of tough self-lubricating non-metallic synthetic material in said undercut bore rotatably engaging said shaft, an outer sleeve substantially coaxial and coextensive with the inner sleeve and engaging telescopically and rotatably thereover and having an undercut bore, a liner of said tough self-lubricating non-metallic synthetic material within the undercut bore of the outer sleeve and rotatably receiving the inner sleeve, the outer sleeve having peripheral portions of different diameters with each such portion spanning about one-half the length of the outer sleeve axially, an exterior reversely directed sleeve extension on the inner sleeve engaging telescopically over the smaller diameter portion of the outer sleeve and having an undercut bore, a liner of said synthetic material in the last-named undercut bore and rotatably receiving said smaller diameter portion, the external diameters of said sleeve extension and the larger diameter portion of the outer sleeve being substantially equal, an end bight portion interconnecting said sleeve extension and inner sleeve and spanning one end of the inner sleeve, and a pair of externally grooved pulley sections press fitted onto the peripheries of said sleeve extension and said larger diameter portion of the outer sleeve.

2. The invention as defined by claim 1, and wherein said liners are thin-walled and formed of Teflon.

3. The invention as defined by claim 1, and wherein said liners are formed of synthetic plastics material and are thin-walled and extend axially for the major portions of the lengths of the bores of the inner and outer sleeves and said sleeve extension.

4. In a loom harness pulley assembly, a pair of closely spaced independently rotatable sheaves adapted to receive a loom harness wire, a bearing assembly common to said sheaves and rotatably mounted upon a carrying shaft, said bearing assembly comprising a first sleeve which is approximately J-shaped in cross section and having concentric bores lined with a tough self-lubricating synthetic plastics material, and a second sleeve telescopically interfitting with said J-shaped sleeve and having a bore lined with said material and being rotatable relative to the J-shaped sleeve, said interfitting sleeves having an overall axial length approximating the combined width of said spaced sheaves and said sheaves pressed onto the peripheries of the first and second sleeves to turn therewith, said bearing assembly readily stackable upon said shaft with like assemblies to maintain a multiplicity of said sheaves uniformly and closely stacked upon said shaft.

5. The invention as defined by claim 4, and wherein one end of said J-shaped sleeve projects slightly beyond the corresponding end of the second sleeve when said sleeves are telescoped, there being an external annular shoulder on the second sleeve adapted to abut the exterior end of the J-shaped sleeve in assembly.

6. In a loom, in combination, a harness sheave support shaft, a uniformly closely spaced stack of harness sheaves independently rotatably mounted upon said shaft and arranged in pairs, a two-part bearing for each pair of sheaves and carrying the latter, said bearing comprising a generally J-shaped sleeve and a telescopically interfitting stepped diameter cylindrical sleeve, said pair of sheaves press fitted on the exteriors of the interfitting sleeves to rotate therewith, said interfitting sleeves being independently rotatable and said J-shaped sleeve rotatable upon said shaft, said interfitting sleeves having a combined axial length approximating the combined axial width of said pair of sheaves, said interfitting sleeves having all of their bores lined with Teflon.

References Cited in the file of this patent

UNITED STATES PATENTS

| | | |
|---|---|---|
| 2,625,447 | Deventer | Jan. 13, 1953 |
| 2,841,020 | Deventer | July 1, 1958 |
| 3,006,382 | Broome | Oct. 31, 1961 |
| 3,073,655 | Rowlett | Jan. 15 1963 |